US010114613B2

United States Patent
Bekas et al.

(10) Patent No.: US 10,114,613 B2
(45) Date of Patent: Oct. 30, 2018

(54) MIXED-PRECISION MEMCOMPUTING SYSTEM

(71) Applicant: International Business Machines Corporation, Armonk, NY (US)

(72) Inventors: Konstantinos Bekas, Horgen (CH); Alessandro Curioni, Gattikon (CH); Evangelos S. Eleftheriou, Rueschlikon (CH); Manuel Le Gallo-Bourdeau, Zurich (CH); Abu Sebastian, Adliswil (CH); Tomas Tuma, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 15/258,842

(22) Filed: Sep. 7, 2016

(65) Prior Publication Data

US 2018/0067720 A1 Mar. 8, 2018

(51) Int. Cl.
 G06F 7/38 (2006.01)
 G06F 7/483 (2006.01)
 G06F 17/16 (2006.01)

(52) U.S. Cl.
 CPC .............. *G06F 7/483* (2013.01); *G06F 17/16* (2013.01)

(58) Field of Classification Search
 CPC .................................. G06F 7/483; G06F 17/16
 USPC .......................................................... 708/513
 See application file for complete search history.

(56) References Cited

U.S. PATENT DOCUMENTS

| 8,397,054 B2 | 3/2013 | Kusmanoff et al. |
| 8,566,576 B2 | 10/2013 | Craik et al. |
| 2014/0289445 A1 | 9/2014 | Savich |
| 2015/0339570 A1 | 11/2015 | Scheffler |

(Continued)

FOREIGN PATENT DOCUMENTS

WO 2012093498 A1 7/2012

OTHER PUBLICATIONS

Mahdi Nazm Bojnordi, et al., "Memristive Boltzmann Machine: a Hardware Accelerator for Combinatorial Optimization and Deep Learning," 2016 IEEE International Symposium on High Performance Computer Architecture (HPCA), Mar. 2016, pp. 1-13.

(Continued)

*Primary Examiner* — Tan V. Mai
(74) *Attorney, Agent, or Firm* — Daniel P. Morris, Esq.; Hoffmann & Baron, LLP

(57) ABSTRACT

A computing system includes computational memory and digital combinational circuitry operatively coupled with the computational memory. The computational memory is configured to perform computations at a prescribed precision. The digital combinational circuitry is configured to increase the precision of the computations performed by the computational memory. The computational memory and the digital combinational circuitry may be configured to iteratively perform a computation to a predefined precision. The computational memory may include circuitry configured to perform analog computation using values stored in the computational memory, and the digital combinational circuitry may include a central processing unit, a graphics processing unit and/or application specific circuitry. The computational memory may include an array of resistive memory elements having resistance or conductance values (Continued)

500 stored therein, the respective resistance or conductance values being programmable.

24 Claims, 12 Drawing Sheets

(56) References Cited

U.S. PATENT DOCUMENTS

2016/0336064 A1* 11/2016 Seo .................. G06N 3/088
2017/0040054 A1    2/2017 Friedman et al.

OTHER PUBLICATIONS

C.M. Angerer, et al., "A Fast, Hybrid, Power-Efficient High-Precision Solver for Large Linear Systems Based on Low-Precision Hardware," Sustainable Computing: Informatics and Systems, Oct. 2015, pp. 1-11.

L. Gan, et al., "Accelerating Solvers for Global Atmospheric Equations Through Mixed-Precision Data Flow Engine," Field Programmable Logic and Applications (FPL), 2013 23rd International Conference on, Sep. 2013, pp. 1-7.

Suyog GuUPTA, et al., "Deep Learning With Limited Numerical Precision," 32nd International Conference on Machine Learning (ICML), Lille 2015, Oct. 2015, pp. 1-10.

C.M. Angerer, et al., "A Fast, Hybrid, Power-Efficient High-Precision Solver for Large Linear Systems Based on Low-Precision Hardware," Sustainable Computing: Informatics and Systems, Oct. 2015, v. 12, pp. 72-82.

* cited by examiner

MIXED-PRECISION MEMCOMPUTING SYSTEM

BACKGROUND

The present invention relates to memcomputing systems for performing mixed precision calculations.

Many conventional computing systems utilize a von Neumann architecture, in which a central processing unit (CPU) including an arithmetic logic unit (ALU) performs computations and may interact with a separate memory unit that provides storage. However, in recent years, the need for alternative architectures has become apparent. Voltage and thus frequency scaling has slowed. To continue the growth predicted by Moore's law, circuit designers have turned to multicore chips and parallelism. However, such solutions may consume relatively large amounts of energy per computation, which may negatively impact the energy efficiency of the computing system.

Memcomputing is a computational paradigm where the computation and logic co-exist in the so-called computational memory. The memcomputing paradigm can address some important computational tasks with high areal/power efficiency. However, significant challenges to practical memcomputing arise due to issues such as device variability, stochasticity, noise etc. These issues cause the computational precision obtainable with conventional memcomputing techniques to be insufficient for many computational tasks.

Accordingly, a need arises for techniques by which computations may be performed using memcomputing that may provide improved precision over conventional memcomputing techniques.

SUMMARY

Embodiments of the present invention may provide the capability to perform computations using memcomputing that may provide improved precision over conventional memcomputing techniques. For example, in an embodiment, a processing apparatus may be capable of executing mixed-precision calculations using different execution units. The various execution units may each be capable of executing calculations at different precision levels. A low-precision memcomputing hardware component may be used in conjunction with a highly precise computing hardware component. Power savings and speed improvements may be achieved by a combination of different precision levels for floating point arithmetic.

In an embodiment of the present invention a computing system may comprise computational memory configured to perform computations at a prescribed precision and digital combinational circuitry coupled with the computational memory and configured to increase the precision of the computations performed by the computational memory. The computational memory and the digital combinational circuitry may be configured to iteratively perform a computation to a predefined precision. The computational memory may comprise circuitry adapted to perform analog computation using values stored in the computational memory and the digital combinational circuitry may comprise at least one of a central processing unit, a graphics processing unit, and application specific circuitry. The computational memory and the digital combinational circuitry may, in one or more embodiments, be implemented as discrete interconnected components. The computational memory and the digital combinational circuitry may, in one or more other embodiments, be integrated into a single chip.

The computational memory may comprise an array of resistive memory elements having resistance or conductance values stored therein, the respective resistance or conductance values being programmable. The computational memory may further comprise a plurality of inputs, each input connected to a different plurality of resistive memory elements, wherein a current in each resistive memory element may be a product of a voltage applied to the input connected to the resistive memory element and the corresponding conductance value of the resistive memory element. The computational memory may further comprise a plurality of outputs, each output connected to a different plurality of resistive memory elements, wherein a current output from each output may be a sum of currents in the plurality of resistive memory elements connected to the output. Each of at least a subset of the resistive memory elements may be selected from the group consisting of phase change memory, metal oxide resistive random-access memory, conductive bridge RAM, and magnetic RAM.

The computational memory may comprise a plurality of analog computing units (i.e., analog computers or analog computing circuitry) comprising transistors, resistors, capacitors, and inductors. The computational memory may comprise a plurality of inductive memory elements having inductance values stored therein, the respective inductance values being programmable. The computational memory may comprise a plurality of capacitive memory elements having capacitance values stored therein, the respective capacitance values being programmable. The computational memory may comprise a plurality of optical memory elements having transmission or absorption values stored therein, the respective transmission or absorption values being programmable.

The system may further comprise circuitry to a) generate an initial solution, b) compute a residual value representing an error in the initial solution using the digital combinational circuitry, c) compute a solution based on the residual value using the computational memory, d) update the solution based on the solution computed using the computational memory, the updating performed using the digital combinational circuitry, e) compute an updated residual value representing an error in the current solution using the digital combinational circuitry, and f) repeat c)-e) until the updated residual value is less than a predefined threshold.

The computational memory and the digital combinational circuitry may be adapted to perform computations for a feedback control system.

In an embodiment of the present invention, a method of computation may comprise performing a computation at a first precision using a computational memory and increasing the precision of the computation using digital combinational circuitry. The method may further comprise iteratively performing the computation and increasing the precision of the computation until a predefined precision is achieved. The method may further comprise a) generating an initial solution, b) computing a residual value representing an error in the initial solution using the digital combinational circuitry, c) computing a solution based on the residual value using the computational memory, d) updating the solution based on the solution computed using the computational memory, the updating performed using the digital combinational circuitry, e) computing an updated residual value representing an error in the current solution using the digital combinational circuitry, and f) repeating c)-e) until the updated residual value is less than a predefined threshold.

In an embodiment of the present invention, a computer program product for performing computation may comprise a non-transitory computer readable storage having program instructions embodied therewith, the program instructions executable by a computer, to cause the computer to perform a method comprising performing a computation at a first precision using a computational memory and increasing the precision of the computation using digital combinational circuitry. The computer program product may further comprise program instructions for iteratively performing the computation and increasing the precision of the computation until a predefined precision is achieved. The computer program product may further comprise program instructions for a) generating an initial solution, b) computing a residual value representing an error in the initial solution using the digital combinational circuitry, c) computing a solution based on the residual value using the computational memory, d) updating the solution based on the solution computed using the computational memory, the updating performed using the digital combinational circuitry, e) computing an updated residual value representing an error in the current solution using the digital combinational circuitry, and f) repeating c)-e) until the updated residual value is less than a predefined threshold.

In an embodiment of the present invention, a feedback control system may comprise computational memory adapted to generate a control signal at a first precision and digital combinational circuitry adapted to generate an error signal from the control signal and from a reference signal at a second precision that is a higher precision than the first precision. In an embodiment, a method of feedback control may comprise generating a control signal at a first precision using computational memory and generating an error signal from the control signal and from a reference signal at a second precision that is a higher precision than the first precision using digital combinational circuitry.

BRIEF DESCRIPTION OF THE DRAWINGS

The details of the present invention, both as to its structure and operation, can best be understood by referring to the accompanying drawings, in which like reference numbers and designations, when used, refer to like elements, and wherein.

DETAILED DESCRIPTION

Figure 2:
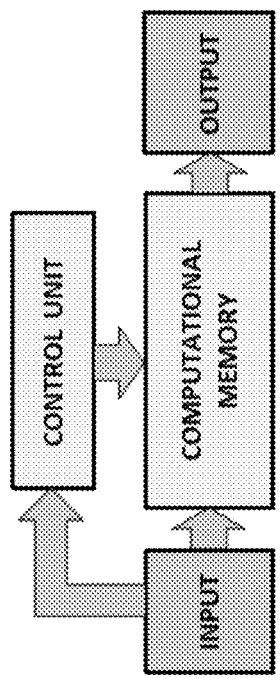
FIG. 2 is an exemplary block diagram of a memcomputing computing architecture.
Figure 1:
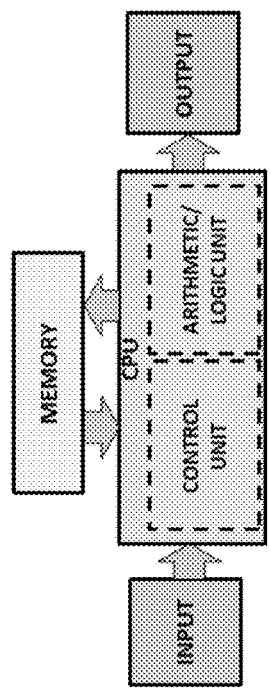
FIG. 1 is an exemplary block diagram of a von Neumann computing architecture.

In contrast to von Neumann computing architectures, an example of which is shown in FIG. 1, memcomputing is a computational paradigm where the computation and logic co-exist in the so-called computational memory. An example of the memcomputing system paradigm is illustrated in FIG. 2. In this example, the computational memory may be used to perform certain low-level computational tasks, such as finding the factors of numbers or matrix multiplications, with the processing performed entirely within the computational memory. Such computational memory may, for example, be implemented as an interconnected array of nanoscale resistive memory devices, or memristor arrays. These arrays may be made compact due to the density of the memristors within the array, and the overall energy efficiency of the devices may be better than that achieved by systems using von Neumann architectures to perform similar computations.

As discussed above, the computational precision obtainable with conventional memcomputing techniques may be insufficient for many computational tasks. In an embodiment, the present invention provides a mixed-precision memcomputing paradigm where the memcomputing system is used in conjunction with a high precision computing system.

As another example, many computations involve the solution of systems of linear equations. To address this problem there are some well-studied and proven methods. These are divided into two main categories: direct, where the solution is given by evaluating a derived formula, and iterative where the solution is approximated based on previous results until a certain acceptable value of precision of the solution is reached. Examples of direct methods may include Cholesky factorization and Gaussian Elimination, while iterative methods include Generalized Minimal Residual Methods (GMRES), the Conjugate Gradient Method, the Minimum Residual Method (MINRES) and the Quasi-minimal residual method (QMR). For large problems, matrix and vector operations may be computationally intensive and may require significant processing time. Some important applications of systems of equations may include genetics, robotics, computer graphics and optimization problems.

Figure 3:
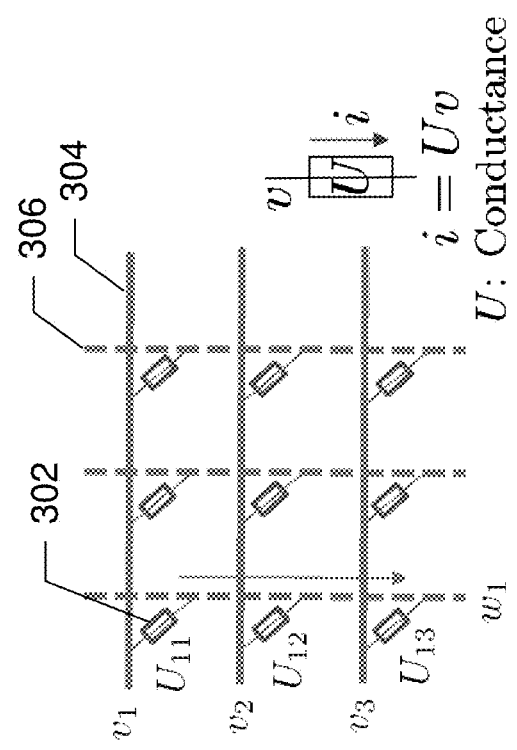
FIG. 3 is an exemplary diagram of resistive memory network.

In one embodiment, the present invention may provide a mixed-precision implementation of an iterative solver for systems of linear equations. In this embodiment, the computationally intense operation of matrix-vector multiplication may be implemented in a resistive memory array, while high precision circuitry may be used to perform less computationally intense improvement of the precision of the solution. An exemplary resistive memory network that may be used to perform matrix-vector multiplication is shown in FIG. 3. In this example, matrix-vector multiplication as shown below is performed:

$$\begin{bmatrix} U_{11} & U_{12} & U_{13} \\ U_{21} & U_{22} & U_{23} \\ U_{31} & U_{32} & U_{33} \end{bmatrix} \begin{bmatrix} v_1 \\ v_2 \\ v_3 \end{bmatrix} = \begin{bmatrix} w_1 \\ w_2 \\ w_3 \end{bmatrix} = \begin{bmatrix} U_{11}v_1 & U_{12}v_2 & U_{13}v_3 \\ U_{21}v_1 & U_{22}v_2 & U_{23}v_3 \\ U_{31}v_1 & U_{32}v_2 & U_{33}v_3 \end{bmatrix}.$$

The matrix elements $U_{11}$ to $U_{33}$ may be stored as conductance values (reciprocal of the resistance values) in an array of memristors 302. The values of the vector elements $v_1$ to $v_3$ may be applied as voltage values to input lines 304 of the memristor array. The current flowing through each memristor represents the product of the voltage applied to the memristor and the conductance value of the memristor (Ohm's Law). The currents from each memristor are collected in output lines 306, such as $w_1$, so that the total current flowing in each output line is the sum of the currents in each memristor (Kirchhoff's Law). Accordingly, the current on the first output line, $w_1$, may be given by $U_{11}v_1+U_{12}v_2+U_{13}v_3$, and so on for the other input and output lines. Such a resistive network may be used to calculate a matrix product for $Uv=w$.

Other modes of operation of memristors for performing calculations are also contemplated. For example, an accumulation dynamics based memory array may be used to calculate a matrix-vector product.

Figure 4:
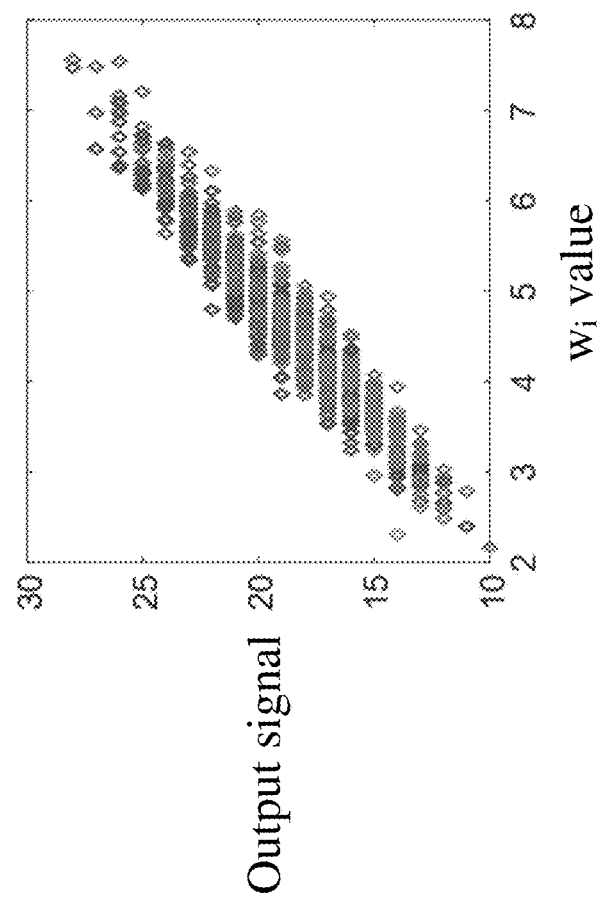
FIG. 4 is an exemplary diagram of operation of an embodiment of a memristor array.

While resistive memory circuits such as those described above may be able to perform fast computations, the results are not sufficiently precise for many practical applications due to device variability and stochasticity. An example of the variability of operation of memristors in an array when used for matrix multiplication is shown in FIG. 4.

Figure 5:
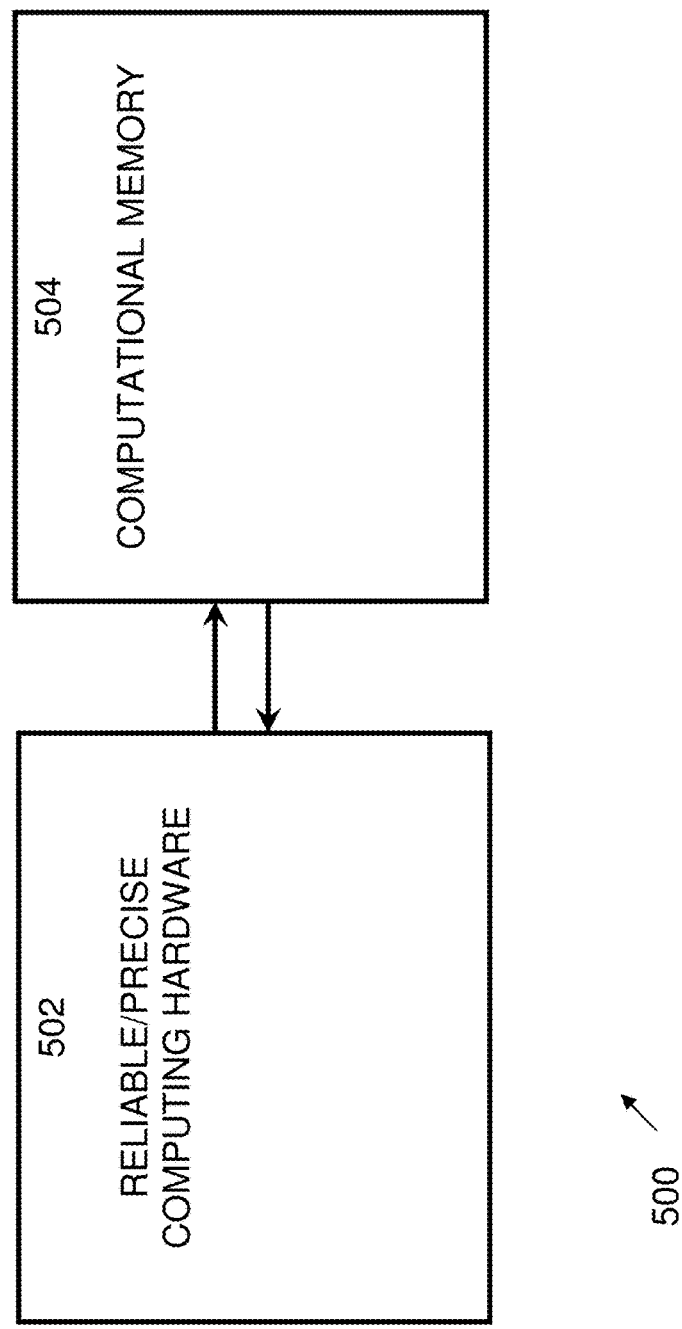
FIG. 5 is an exemplary block diagram of a mixed-precision memcomputing system.

An exemplary mixed-precision memcomputing system 500, according to an embodiment of the present invention, is shown in FIG. 5. Reliable/precise computing hardware 502 may be operatively or communicatively connected to a computational memory 504. For example, reliable/precise computing hardware 502 may include a combinational digital electronic circuit that performs computations such as arithmetic, bitwise logical operations, comparisons, etc. Computational memory 504 may be memory structured to perform basic computational operations or primitives. In an embodiment, computational memory 504 may be configured to perform matrix-vector multiplications and may comprise a cross-bar structure of resistive memory elements, such as that shown in FIG. 3. The computational memory 504 may provide a speed-up of this computational primitive with improvements in terms of power and speed over performing similar calculations on the reliable computing hardware.

Many computations may be formulated as an iterative sequence of two parts. In the first part of the sequence, an approximate solution may be computed, for example using computational memory 504. This part involves a heavy computational load, which may be efficiently handled by computational memory 504. The second part of the sequence involves computing an estimate of the error between the approximate solution and a precise solution and adapting the computed solution accordingly. This part involves a relatively light computational load, but increased precision, which may be handled by reliable/precise computing hardware 502. Examples of computations that may be performed using this sequence may include solving linear systems, Least Squares, Optimization, Regression, etc. Such computations may have applications in disciplines such as Engineering, Machine Learning, Statistics, Finance, Big Data, etc.

Figure 6:
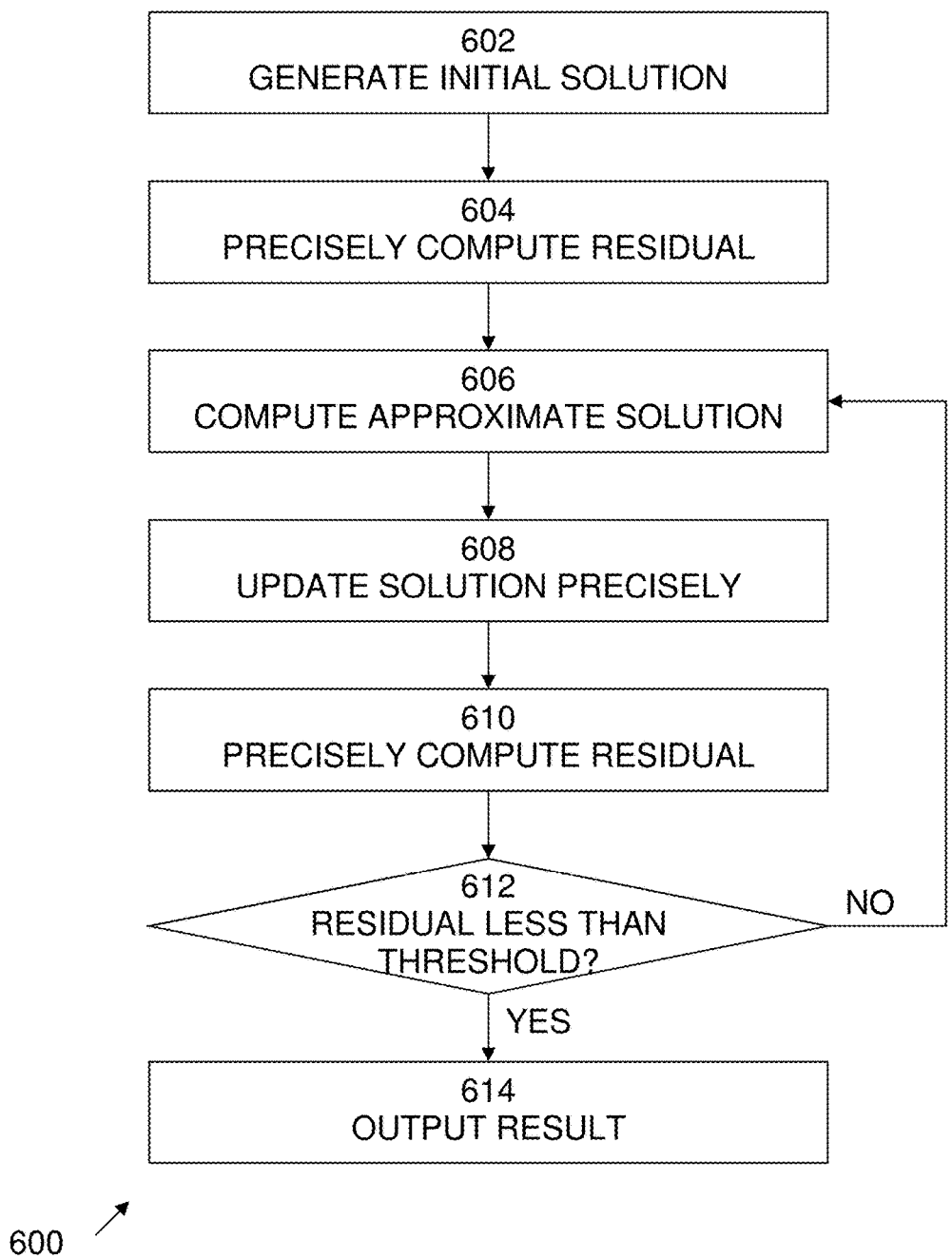
FIG. 6 is an exemplary flow diagram of a process for iteratively performing a computation.

An example of a process 600 for iteratively performing a computation using, for example, mixed-precision memcomputing system 500, is shown in FIG. 6. Process 600 may be generally applicable to performing a variety of computations. For clarity, in describing process 600, reference will be made to the example of computing the solution to a system of linear equations using a conjugate gradient method. However, this is merely an example. The present invention contemplates application to performance of any computation.

For the example of computing a solution to a system of linear equations using a conjugate gradient method, the system may be represented as $Ax=b$ and the solution to this system may be represented as x. Process 600 begins with 602, in which an initial solution is generated. The processing of generating an initial value may depend upon the computation being performed. For the example of a system of linear equations, an initial value of xo may be generated by guessing at an initial value or simply setting $x_0=0$. At 604, using the initial value xo, the residual value representing an error between the initial solution and a correct solution may be precisely computed using reliable/precise computing hardware 502. For the example of a system of linear equations represented as $Ax=b$, the residual value may be found as $r=b-Ax$, with $x=x_0$. At 606, an approximate solution may be computed using computational memory 504. For example, an approximate solution to $Az=r$ may be determined using computational memory 504. For example, the matrix multiplication steps in the conjugate gradient method may be performed using computational memory, such as a resistive memory array as shown in FIG. 3.

At 608, the initial or current solution may be updated precisely using reliable/precise computing hardware 502. For example, the current value of x, $x_i$, may be updated as $x_{i+1}=x_i+z$. At 610, using the current value $x_i$, the residual value may be precisely computed using reliable/precise computing hardware 502. For example, the residual value may be found as $r=b-Ax$, with $x=x_i$. At 612, it may be determined whether the residual value is less than a predetermined threshold of precision. This threshold may vary depending on the computation being performed, as well as based on the application of the computation. If it is determined that the residual value is not less than the threshold, then process 600 loops back to 606. The processing at 606-612 may be repeated or iterated until, at 612, it is determined that the residual value is less than the threshold. In this case, the solution has achieved the desired or necessary precision, and at 614, the solution result may be output.

Typically, the most computationally intensive processing is performed at 606. For the example of a system of linear equations, this processing may be performed using a non-volatile memory cross-bar array with memristors as shown in FIG. 3. The array of memristors may perform the matrix multiplication steps in the conjugate gradient method.

Figure 7:
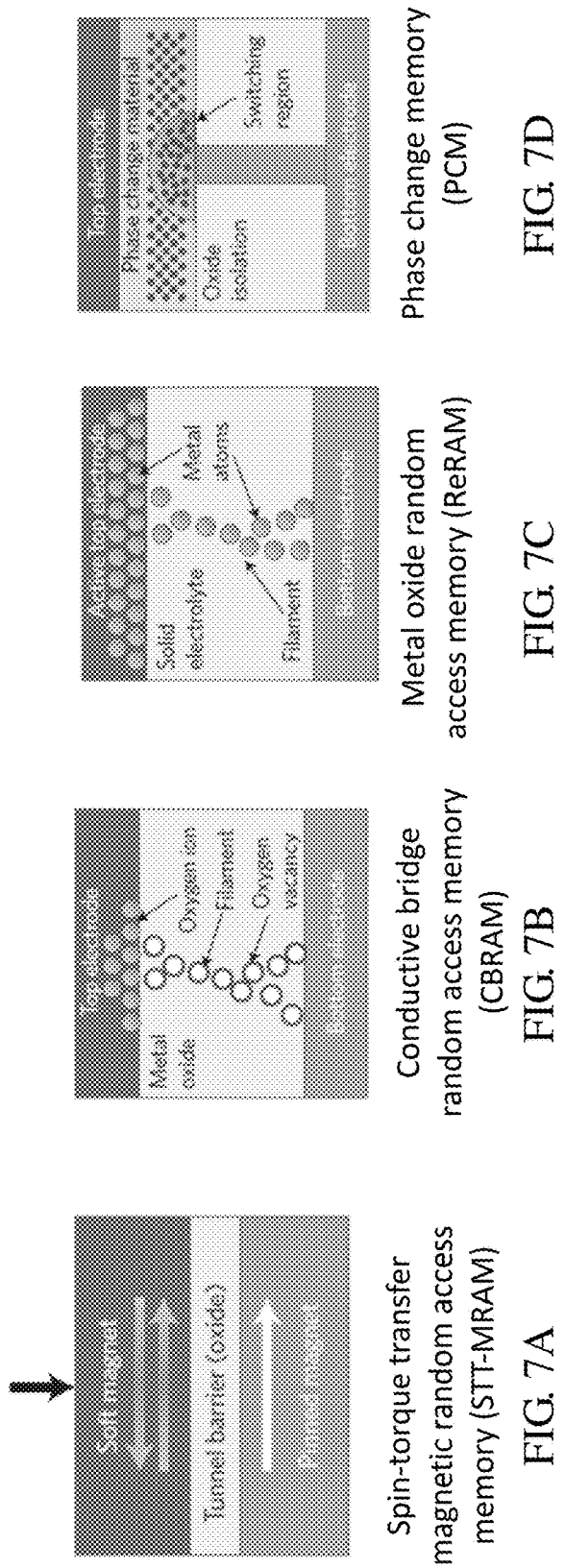
FIG. 7A is an exemplary diagram of a spin-torque transfer magnetic random access memory (STT-MRAM)
FIG. 7B is an exemplary diagram of a conductive bridge random access memory (CBRAM)
FIG. 7C is an exemplary diagram of a metal oxide resistive random access memory (ReRAM)
FIG. 7D is an exemplary diagram of a phase-change memory (PCM)

Many different structures may be used as resistive memory elements. For example, a spin-torque transfer magnetic random access memory (STT-MRAM) is shown in FIG. 7A. A conductive bridge random access memory (CBRAM) is shown in FIG. 7B. A metal oxide random access memory (ReRAM) is shown in FIG. 7C. A phase-change memory (PCM) is shown in FIG. 7D.

Figure 8:
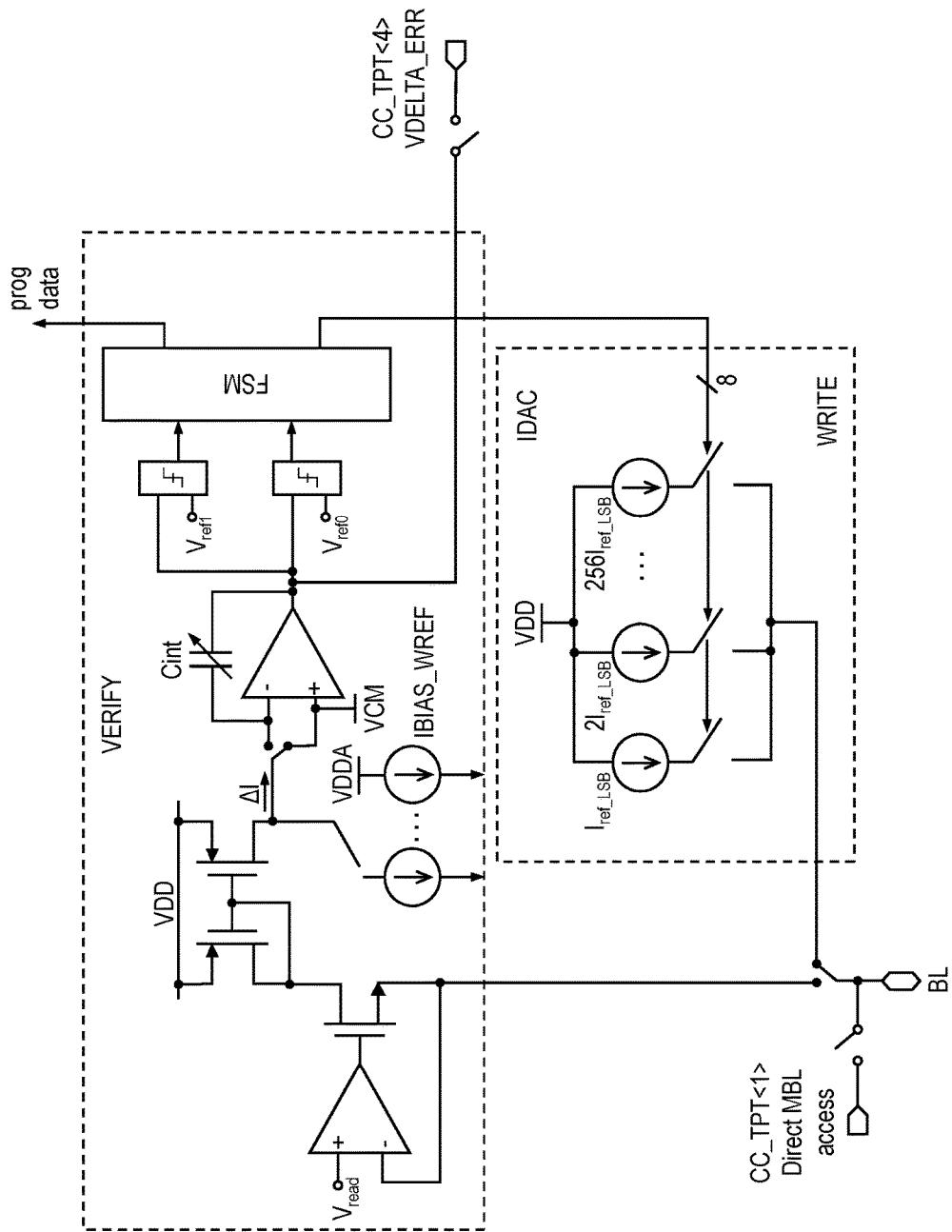
FIG. 8 is an exemplary schematic diagram of a circuit for programming resistive memory elements.

Programming of the resistive memory elements may be performed in a number of ways. For example, a circuit for mapping the values (u) of a matrix to conductance values, according to an embodiment of the present invention is shown in FIG. 8. Iterative programming may be used to set the phase-change elements to the desired conductance values. In this example, the range of read current at a read voltage of 0.2 V may be 0 mA to 10 mA. The conductance range may be 0 to 50 mS. The values of the U matrix may be normalized to fall between 0 and 1 such that the conductance G=Ku, where K is a scaling factor for u. Then, the values of the normalized matrix may be mapped to conductance values.

Figure 9:
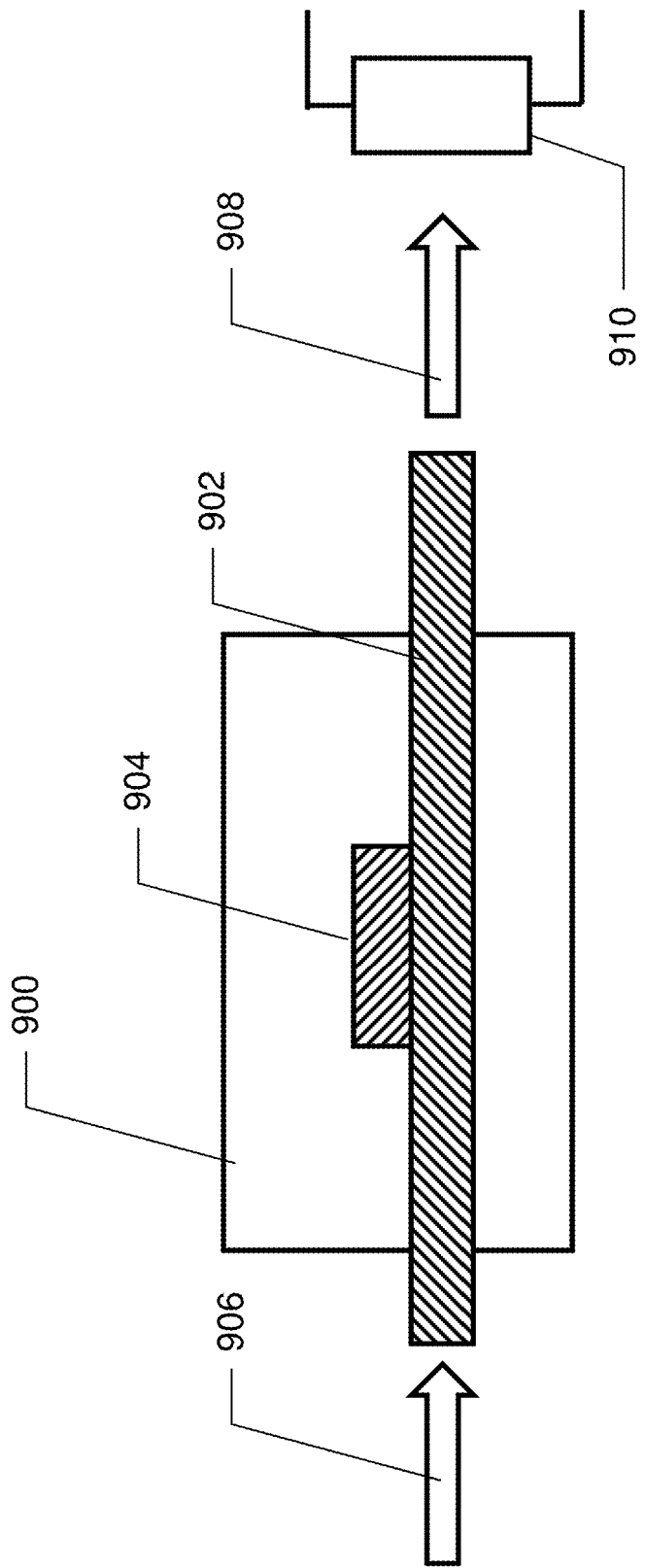
FIG. 9 is an exemplary block diagram of an optical memory element.

An embodiment of the present invention using optical components is shown in FIG. 9. A memcomputing unit 900 includes an optical waveguide 902 and a tunable material layer 904 that absorbs a fraction of the light in waveguide 902. Input pulses 906 may be input into waveguide 902. The pulses travel into the optical memcomputing multiplier 900. When light travels along the waveguide 902, some of the energy of the light will couple into the tunable material layer 904, which absorbs part of the light. By tuning the material properties of the tunable material layer 904, the intensity of the output light 908 may be scaled. Accumulators and/or summing blocks may be realized using a photodetector 910 connected to receive the transmitted light 908, for example.

Figure 10:
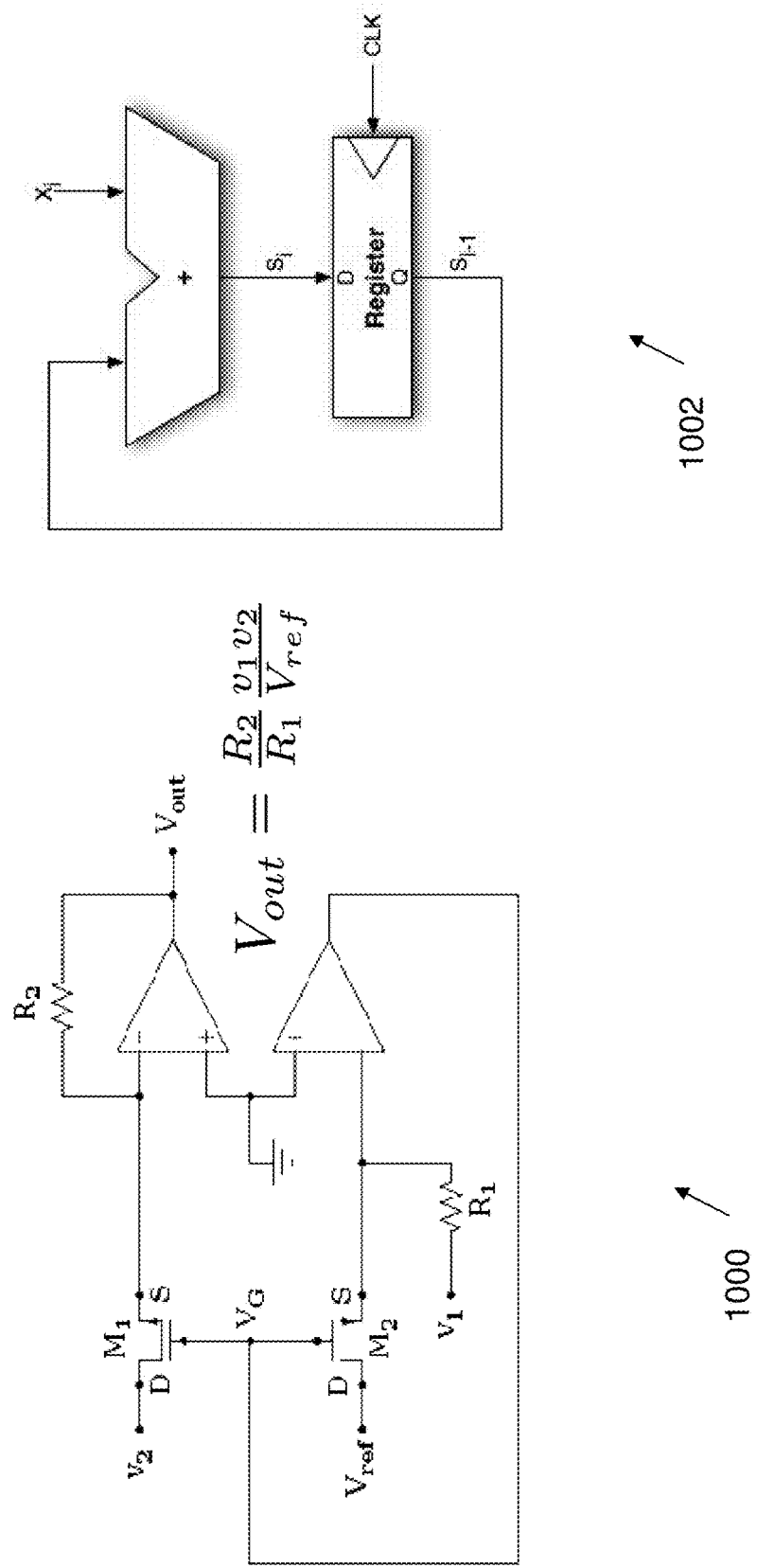
FIG. 10 is an exemplary schematic diagram of circuits for emulating resistive memory elements.

An embodiment of the present invention using emulation of the memcomputing unit is shown in FIG. 10. In this example, multipliers and accumulators may be realized using conventional electrical components such as transistors, resistors, capacitors, etc. Analog multiplier 1000 may be coupled to a conventional high precision computing system to create a mixed precision system. The analog components may suffer from noise or other errors. The algorithms executed on the high precision computing unit may be configured to handle these errors by using an iterative method. Likewise, an accumulator 1002 may be used in an embodiment of the present invention with emulation of the memcomputing unit.

Figure 11:
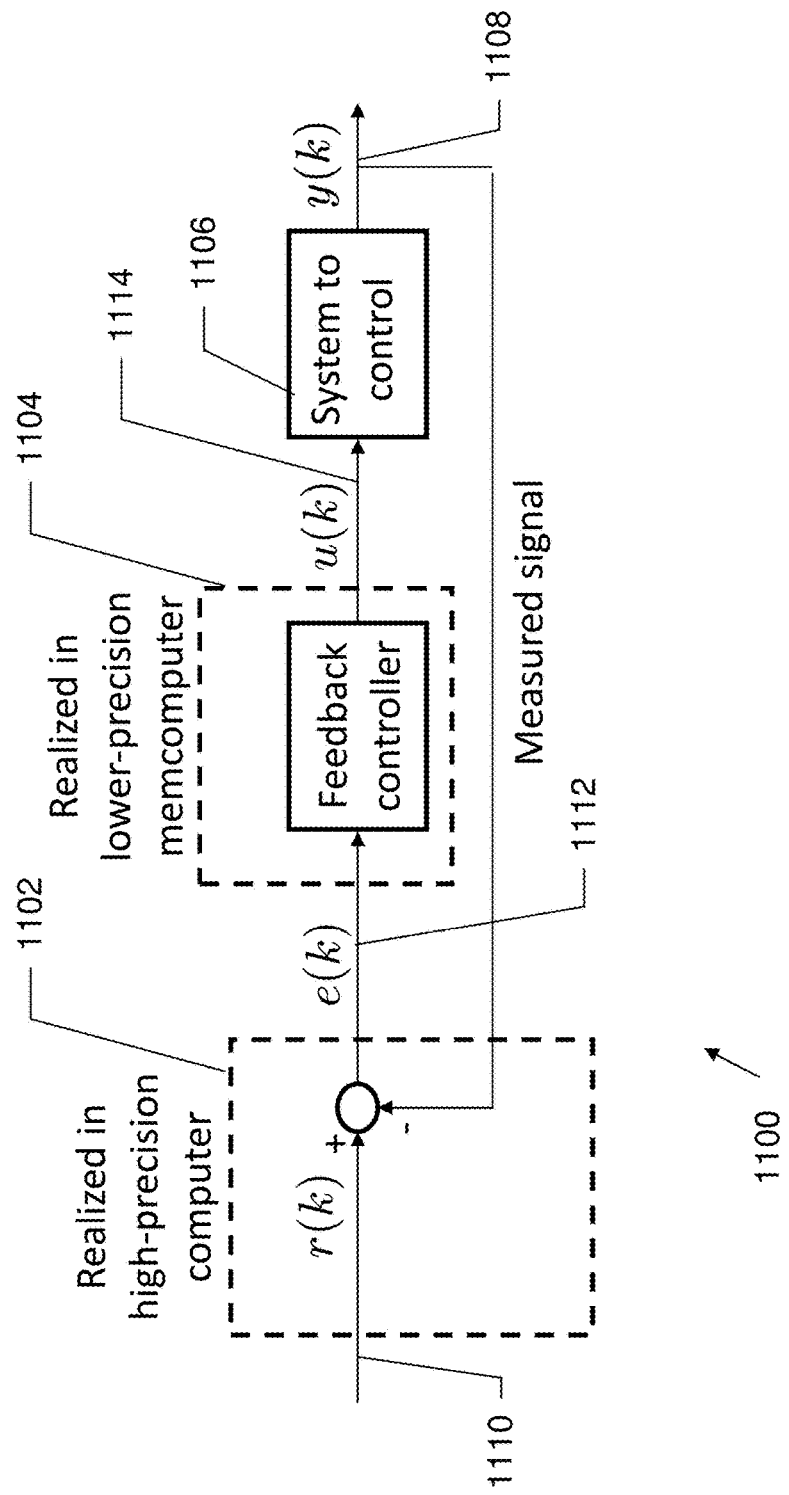
FIG. 11 is an exemplary block diagram of a feedback control system utilizing a mixed-precision memcomputing implementation.

An exemplary block diagram of a feedback control system 1100 utilizing a mixed-precision memcomputing implementation is shown in FIG. 11. Such a feedback control system may be used to implement, for example, a reference tracking system, such as a positioning system. The reference signal may indicate the trajectory to be followed. The system to be controlled may be a robotic manipulator or a positioning stage. Sensors may provide the positional information at any point in time.

System 1100 may include an error signal generating block 1102, which may be implemented using a higher-precision computational element, for example a computer including a central processing unit (CPU) with an arithmetic logic unit (ALU), a feedback controller block 1104, which may be implemented using a lower-precision computational element, such as a memcomputer, and a system that is controlled 1106. A signal y(k) 1108 that represents the operation of the system that is controlled 1106 may be measured and input to error signal generating block 1102. For example, signal y(k) 1108 may represent a position of an element of the system that is controlled 1106, such as a robotic manipulator or a positioning stage, a speed or velocity of an element of the system that is controlled 1106, etc. A reference or control signal r(k) 1110 representing a commanded or desired value of operation of the system that is controlled 1106 may also be input to error signal generating block 1102.

A computational task that may be performed in the operation of system 1100 may be to calculate an error signal e(k) 1112, which may be reference signal r(k) 1110 minus the measured sensor signal y(k) 1108. As the error signal e(k) 1112 may be small, this computation may preferably be performed at high accuracy, and thus may be implemented in higher-precision computational element 1102. The feedback controller 1104 may be implemented with a lower-precision computational element 1104, such as a memcomputing system, to generate control signal u(k) 1114.

Figure 12:
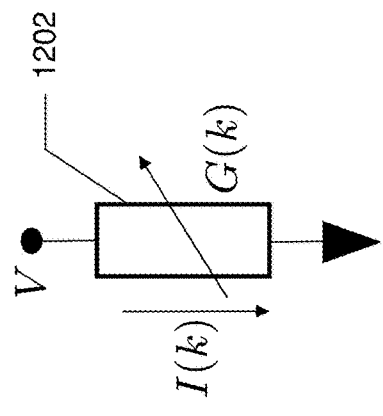
FIG. 12 is an exemplary block diagram of operation of a memcomputing element in a feedback control system.

For example, as shown in FIG. 12, a memcomputing element 1202 may be used for feedback control. In this example, based on the error signal, e(k) 1112, electrical pulses may be applied to memcomputing element 1202 to induce a conductance change of $\Delta G$ proportional to $k_i*e(k)$. Then, a bias voltage V may be applied to measure the conductance G and the resulting current I(k) may be translated to a voltage signal u(k) 1114 to be applied to the system being controlled 1106. The performance of such a controller 1100 may be acceptable even when the feedback controller 1104 is implemented with lower-precision.

Figure 13:
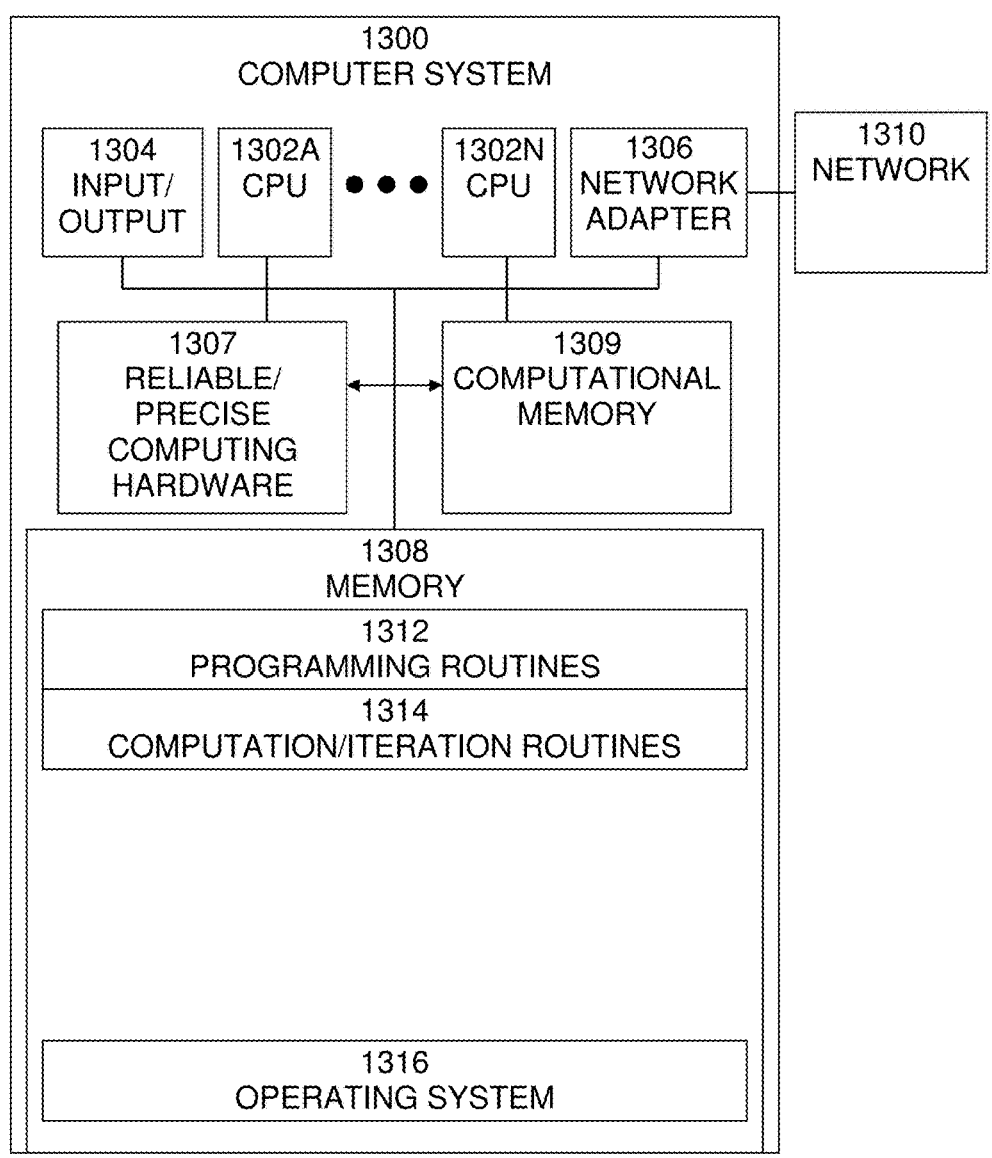
FIG. 13 is an exemplary block diagram of a computer system in which processes involved in the embodiments described herein may be implemented.

An exemplary block diagram of a computer system 1300, in which embodiments described herein may be implemented, is shown in FIG. 13. Computer system 1300 typically includes a programmed general-purpose computer system, such as an embedded processor, system on a chip, personal computer, workstation, server system, and minicomputer or mainframe computer. Computer system 1300 may include one or more processors (CPUs) 1302A-1302N, input/output circuitry 1304, network adapter 1306, reliable/precise computing hardware 1307, memory 1308, and computational memory 1309. CPUs 1302A-1302N execute program instructions in order to carry out the functions of the present invention. Typically, CPUs 1302A-1302N are one or more microprocessors, such as an INTEL PENTIUM® processor. FIG. 13 illustrates an embodiment in which computer system 1300 is implemented as a single multiprocessor computer system, in which multiple processors 1302A-1302N share system resources, such as memory 1308, input/output circuitry 1304, and network adapter 1306. However, the present invention also contemplates embodiments in which computer system 1300 is implemented as a plurality of networked computer systems, which may be single-processor computer systems, multi-processor computer systems, or a mix thereof.

Input/output circuitry 1304 provides the capability to input data to, or output data from, computer system 1300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1306 interfaces device 1300 with a network 1310. Network 1310 may be any public or proprietary LAN or WAN, including, but not limited to the Internet.

Reliable/precise computing hardware 1307 may include a combinational digital electronic circuit that performs computations such as arithmetic, bitwise logical operations, comparisons, etc. Computational memory 1309 may be memory structured to perform basic computational operations or primitives. Reliable/precise computing hardware 1307 and computational memory 1309 may be implemented as electronic circuitry separate from CPUs 1302A-1302N, as in the example shown in FIG. 13, or reliable/precise computing hardware 1307 and computational memory 1309 may be circuitry included in CPUs 1302A-1302N.

Memory 1308 stores program instructions that are executed by, and data that are used and processed by, CPU 1302 to perform the functions of computer system 1300. Memory 1308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1308 may vary depending upon the function that computer system 1300 is programmed to perform. However, one of skill in the art would recognize that routines implementing such functions, along with the memory contents related to those routines, may not be included on one system or device, but rather may be distributed among a plurality of systems or devices, based on well-known engineering considerations. The present invention contemplates any and all such arrangements.

In the example shown in FIG. 13, memory 1308 may include programming routines 1312, computation/iteration routines 1314, and operating system 1316. For example, programming routines 1312 may include routines that program memory elements, such as resistive memory elements, in computational memory 1309. Computation/iteration routines 1314 may include routines perform computations using reliable/precise computing hardware 1307 and computational memory 1309, and to perform any needed iteration. Operating system 1316 provides overall system functionality.

As shown in FIG. 13, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computing system comprising:
computational memory configured to perform computations at a first precision; and
digital combinational circuitry operatively coupled with the computational memory and configured to increase the precision of the computations performed by the computational memory;
wherein the computational memory and the digital combinational circuitry are configured to iteratively perform a computation to a second precision that is a higher precision than the first precision.

2. The system of claim 1, wherein:
the computational memory comprises circuitry configured to perform analog computation using values stored in the computational memory; and
the digital combinational circuitry comprises at least one of a central processing unit, a graphics processing unit, and application specific circuitry.

3. The system of claim 1, wherein the computational memory and the digital combinational circuitry are implemented as discrete interconnected components.

4. The system of claim 1, wherein the computational memory and the digital combinational circuitry are integrated into a single chip.

5. The system of claim 1, wherein the computational memory comprises an array of resistive memory elements having resistance or conductance values stored therein, the respective resistance or conductance values being programmable.

6. The system of claim 5, wherein the computational memory is configured to perform a matrix multiplication computation.

7. The system of claim 5, wherein the computational memory further comprises a plurality of inputs, each input connected to a different plurality of resistive memory elements, wherein a current in each resistive memory element is a product of a voltage applied to the input connected to the resistive memory element and the conductance value of the corresponding resistive memory element.

8. The system of claim 7, wherein the computational memory further comprises a plurality of outputs, each output connected to a different plurality of resistive memory elements, wherein a current output from each output is a sum of currents in the plurality of resistive memory elements connected to the output.

9. The system of claim 5, wherein each of at least a subset of the resistive memory elements is selected from the group consisting of phase change memory, metal oxide resistive random-access memory (RAM), conductive bridge RAM, and magnetic RAM.

10. The system of claim 1, wherein the computational memory comprises a plurality of analog computing units, each of at least a subset of the analog computing units comprising at least one of transistors, resistors, capacitors and inductors.

11. The system of claim 1, wherein the computational memory comprises a plurality of inductive memory elements having inductance values stored therein, the respective inductance values being programmable.

12. The system of claim 1, wherein the computational memory comprises a plurality of capacitive memory elements having capacitance values stored therein, the respective capacitance values being programmable.

13. The system of claim 1, wherein the computational memory comprises a plurality of optical memory elements having transmission or absorption values stored therein, the respective transmission or absorption values being programmable.

14. The system of claim 1, further comprising circuitry configured to:
   a) generate an initial solution;
   b) compute a residual value representing an error in the initial solution using the digital combinational circuitry;
   c) compute a solution based on the residual value using the computational memory;
   d) update the solution based on the solution computed using the computational memory, the updating performed using the digital combinational circuitry;
   e) compute an updated residual value representing an error in the current solution using the digital combinational circuitry; and
   f) repeat c)-e) until the updated residual value is less than a predefined threshold.

15. The system of claim 1, wherein the computational memory and the digital combinational circuitry are configured to perform computations for a feedback control system.

16. The system of claim 15, wherein:
   the digital combinatorial circuitry is configured to generate an error signal as a function of a reference signal and a sensor signal;
   the computational memory is configured to generate a control signal as a function of the error signal; and
   the sensor signal measures an operation based on the control signal.

17. The system of claim 16, wherein the digital combinatorial circuitry generates the error signal as a difference between the reference signal and the sensor signal.

18. The system of claim 16, wherein the computational memory comprises an array of resistive memory elements having resistance or conductance values stored therein, the respective resistance or conductance values being programmable, and wherein the computational memory is configured to generate the control signal as a function of the error signal by:
   inducing a conductance change proportional to the error signal by applying one or more electrical pulses to at least one of the resistive memory elements;
   generating a current measuring a conductance of the at least one of the memory resistive memory elements by applying a bias voltage thereto;
   translating the current to a voltage signal; and
   outputting the voltage signal as the control signal.

19. A method of computation, comprising:
   performing a computation at a first precision using a computational memory;
   increasing the precision of the computation using digital combinational circuitry; and
   iteratively performing the computation and increasing the precision of the computation until a second precision that is a higher precision than the first precision is achieved.

20. The method of claim 19, further comprising:
   a) generating an initial solution;
   b) computing a residual value representing an error in the initial solution using the digital combinational circuitry;
   c) computing a solution based on the residual value using the computational memory;
   d) updating the solution based on the solution computed using the computational memory, the updating performed using the digital combinational circuitry;
   e) computing an updated residual value representing an error in the current solution using the digital combinational circuitry; and
   f) repeating c)-e) until the updated residual value is less than a predefined threshold.

21. A computer program product for performing computation comprising a non-transitory computer readable storage medium having program instructions embodied therewith, the program instructions executable by a computer, to cause the computer to perform a method comprising:
   performing a computation at a first precision using a computational memory;
   increasing the precision of the computation using digital combinational circuitry; and
   iteratively performing the computation and increasing the precision of the computation until a second precision that is a higher precision than the first precision is achieved.

22. The computer program product of claim 21, further comprising program instructions for:
   a) generating an initial solution;
   b) computing a residual value representing an error in the initial solution using the digital combinational circuitry;
   c) computing a solution based on the residual value using the computational memory;
   d) updating the solution based on the solution computed using the computational memory, the updating performed using the digital combinational circuitry;
   e) computing an updated residual value representing an error in the current solution using the digital combinational circuitry; and
   f) repeating c)-e) until the updated residual value is less than a predefined threshold.

23. A feedback control system, comprising:
   computational memory configured to generate a control signal at a first precision; and
   digital combinational circuitry operatively coupled with the computational memory and configured to generate an error signal as a function of the control signal and a reference signal, the reference signal being at a second precision that is a higher precision than the first precision.

24. A method of feedback control, the method comprising:
   generating a control signal at a first precision using computational memory; and
   generating an error signal as a function of the control signal and a reference signal using digital combinational circuitry, the reference signal being at a second precision that is a higher precision than the first precision.

* * * * *